United States Patent [19]

Leonardis

[11] 4,254,987
[45] Mar. 10, 1981

[54] SUPPORT STRUCTURE FOR A MOTOR BUS
[75] Inventor: Raffaele Leonardis, Turin, Italy
[73] Assignee: Centro Ricerche Fiat S.p.A., Orbassano, Italy
[21] Appl. No.: 97,606
[22] Filed: Nov. 26, 1979
[30] Foreign Application Priority Data
  Dec. 19, 1978 [IT] Italy .............................. 569896 A/78
[51] Int. Cl.³ ............................................. B62D 31/02
[52] U.S. Cl. .................................... 296/178; 296/187; 296/197; 52/79.1; 52/143; 52/648
[58] Field of Search ............... 296/178, 187, 188, 196, 296/197; 52/79.1, 143, 648
[56] References Cited
U.S. PATENT DOCUMENTS

| 2,119,655 | 6/1938 | Stout | 296/178 |
| 3,186,755 | 6/1965 | Ward | 296/178 |
| 3,778,528 | 12/1973 | Heifetz | 52/79.1 |
| 3,794,374 | 2/1974 | Manning | 296/197 |
| 3,989,562 | 11/1976 | Hladik | 296/187 |
| 4,059,303 | 11/1977 | Manri | 296/187 |

Primary Examiner—Robert R. Song
Attorney, Agent, or Firm—Sughrue, Rothwell, Mion, Zinn & Macpeak

[57] ABSTRACT

A support structure of a motor bus comprises a plurality of modular cells each comprising two rectangular end frames made up of two channel section uprights and upper and lower channel section crosspieces, the channels facing axially away from the other frame and having flanges for welding to corresponding members of a contiguous frame of an adjacent modular cell in the structure. Longitudinal reinforcement is provided by longitudinal members at the upper corners which together form a box-section stringer and by channel section stiffeners joining the lower crosspieces. A corrugated panel overlies the lower crosspieces and is joined to them.

10 Claims, 4 Drawing Figures

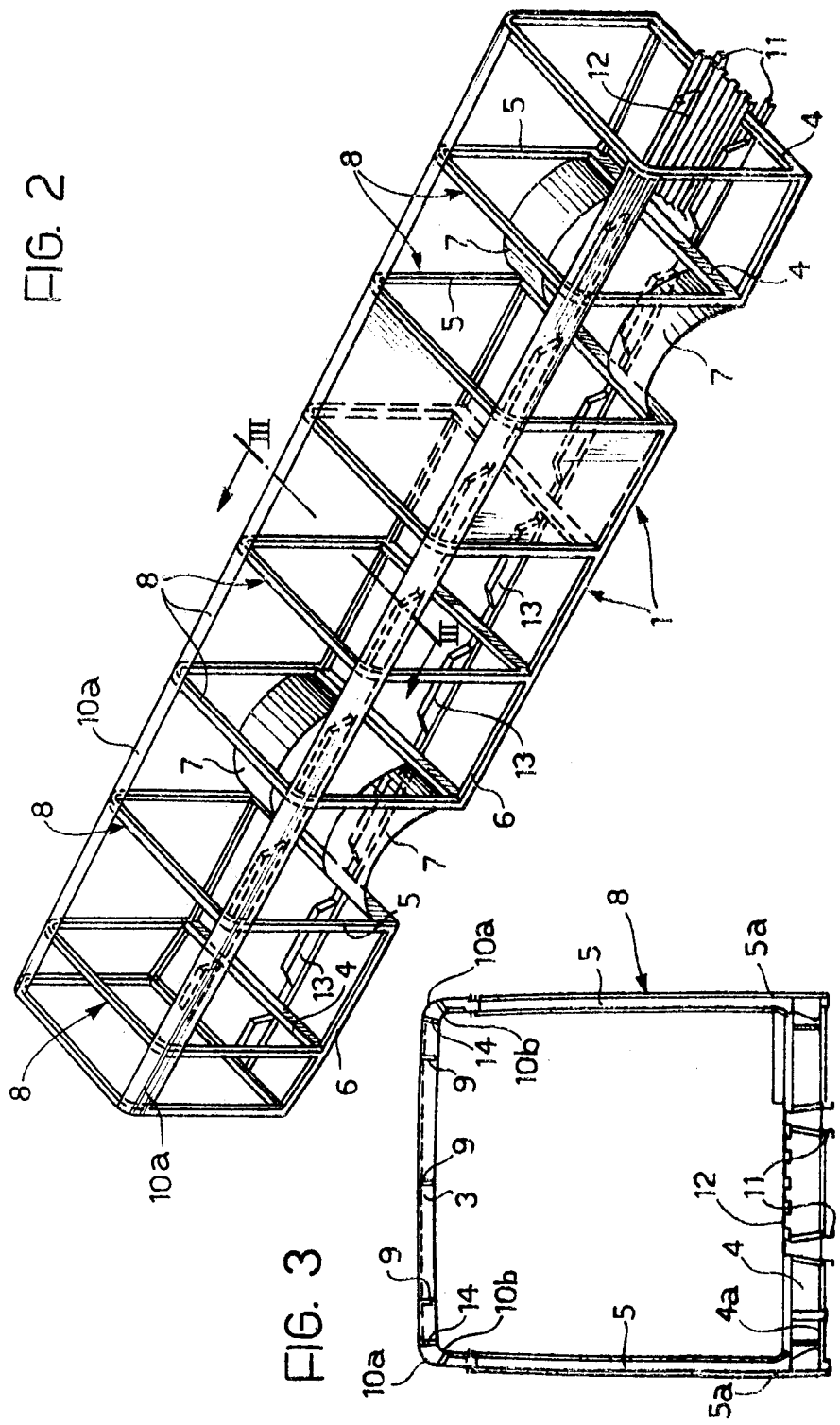

SUPPORT STRUCTURE FOR A MOTOR BUS

The present invention relates to the framework or support structure of a motor bus. As used in this specification the term "motor bus" will be understood to relate also to coaches.

The present invention seeks to provide a support structure for a motor bus, which, whilst being of simple construction will also lend itself to adaptations and modifications in the assembly stage, allowing the production of motor buses having different lengths and or a different number of axles.

According to the present invention there is provided a support structure for a motor bus, characterised in that it comprises a plurality of modular cells connected together in a row extending in the longitudinal direction of the bus, each modular cell comprising a pair of rectangular end frames lying in a plane extending transverse the longitudinal axis of the bus and being constituted by upper and lower horizontal crosspieces connected by two upright struts in such a way as to form two upper corners and two lower corners, and two pairs of longitudinal elements which connect together the upper corners and the lower corners respectively of the said end frames, the horizontal crosspieces and the upright struts of the said end frames being of channel section with the channel facing away from the other frame of the cell in the axial direction, and having, at least along a substantial part of the length of at least some of the said horizontal crosspieces and upright struts, respective flanges lying in a plane parallel to the general plane of the associated end frame, the flanges of two adjacent frames belonging to two contiguous modular cells in the support structure being welded together so that the said two adjacent frames form a box-section hoop, and box-section reinforcing means interconnecting the modular cells together longitudinally.

In a preferred embodiment of the invention the said reinforcing means interconnecting the said modular cells comprise two pairs of upper longitudinal members which connect together the upper corners of the end frames of the modular cells, each pair of longitudinal members comprising an outer upper longitudinal member fixed to the outer edges of the upper corners of the hoops and an inner upper longitudinal member fixed to the inner edges of the upper corners of the said hoops, two lower longitudinal members fixed below the said lower horizontal crosspieces of the end frames of the modular cells, and a longitudinal panel element fixed to the tops of the said lower horizontal crosspieces.

Preferably each modular cell is provided with two pairs of auxiliary longitudinal spacers, each of which is supported on one of the lower longitudinal members and fixed above to the said longtiudinal panel element, in such a way as to form two longitudinal box-section elements extending axially of each modular cell.

In a practical embodiment of the present invention, the said longitudinal panel element has longitudinally extending corrugations. This element may alternatively be constituted, however, by a plurality of longitudinal sections, each having longitudinally extending corrugations and each associated with one of the modular cells of the support structure, the said longitudinal sections being overlapped with each other at their ends.

Preferably, each modular cell is further provided with a plurality of auxiliary longitudial elements which connect together the upper horizontal crosspieces of the two end frames of each modular cell.

The longitudinal elements which connect together the lower corners of the end frames of those modular cells located in positions corresponding to the positions of the axles of the vehicle are preferably constituted by two arcuate elements serving as mudguards, whilst the longitudinal elements of the other modular cells are preferably constituted by substantially rectilinear longitudinal stringers.

Two embodiments of the present invention will now be more particularly described, by way of example, with reference to the accompanying drawings, in which:

FIG. 2 is a perspective view of a complete support structure for a motor bus formed with a plurality of modular cells such as those illustrated in FIG. 1;

FIG. 3 is a section taken on the line III—III of FIG. 2; and

Figure 1:
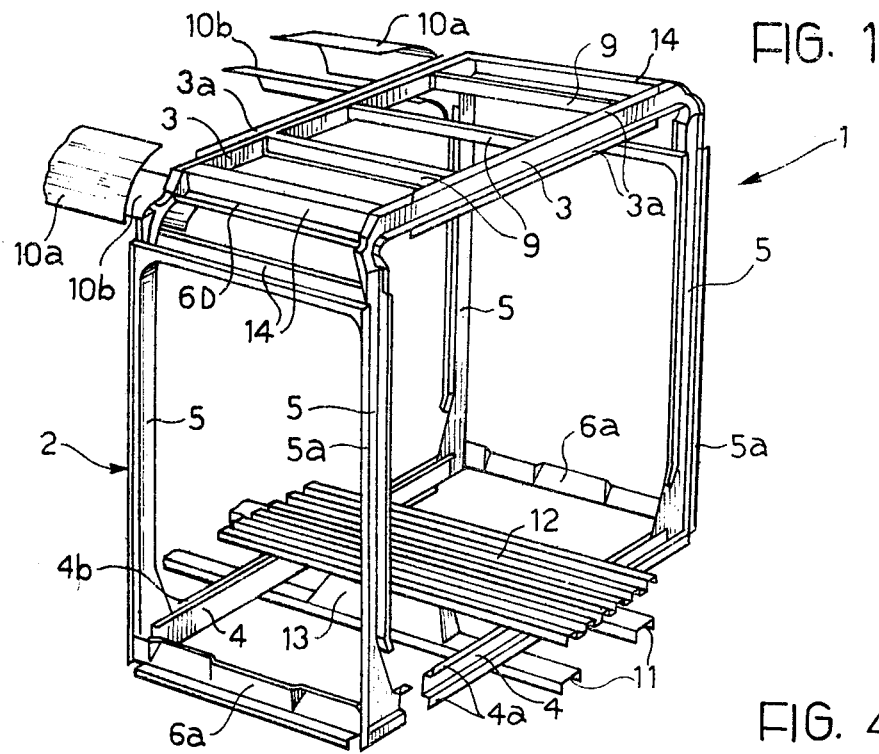
FIG. 1 is a perspective view of a modular cell forming part of a support structure constituting one embodiment of the invention.

Referring now to the drawings, the support structure illustrated in FIG. 2 is made up from a plurality of modular cells, one of which is illustrated in FIG. 1, fixed together to extend in the longitudinal direction of the bus.

Each modular cell comprises a pair of rectangular end frames 2 lying in respective transverse planes across the longitudinal axis of the bus. Each of the end frames 2 comprises an upper horizontal crosspiece or beam 3, a lower horizontal crosspiece 4, and two vertical struts 5 which join respective ends of the upper and lower crosspieces 2,3.

Respective lower and upper corners of the rectangular end frames 2 are connected together by means of two pairs of longitudinal stringers 6a, 6b. In the case of a modular cell intended to be located over one of the axles of the bus, the lower longitudinal stringers 6a are replaced by two arcuate elements 7 serving as mudguards (see FIG. 2).

The upper and lower horizontal crosspieces 3,4 and the vertical struts 5 of the end frames 2 have, in cross section, a channel form, the channels of the elements of each end frame facing axially away from the other end frame. Each of the elements of the end frames is, moreover, provided for at least a substantial part of its length with flanges at the longitudinal edges of the opening of the channel, the flanges being respectively indicated with the reference numerals 3a, 4a and 5a, and lying in a plane parallel to the general plane of the associated end frame, that is perpendicular to the longitudinal axis of the bus.

Upon assembly of the support structure the flanges of two adjacent end frames 2 belonging to two contiguous modular cells 1 are welded together, so that the two adjacent end frames form a rectangular frame or hoop 8 the horizontal and vertical limbs of which are box-section elements for most of their length.

Each modular cell 1 is, moreover, provided with three auxiliary longitudinal elements 9 which join together the upper horizontal crosspieces of the two end frames 2 of the modular cell. In addition, the support structure is also provided with box-section reinforcing means which connect the modular cells together longitudinally to form the overall frame of the support structure. This reinforcing means includes two pairs of upper longitudinal members 10a, 10b which connect together the upper corners of the transverse hoops 8. Each pair of longitudinal members 10a, 10b includes an outer longitudinal member 10a fixed to the outer edge of the hoop 8 at the upper corners thereof, and an inner longitudinal member 10b which is fixed to the inner edges of the corners of the hoops 8.

The corners of each modular cell are further reinforced by two pairs of auxiliary longitudinal elements 14 which connect together the upper corners of the two end frames 2 in such a way as to complete longitudinally extending box-section elements running, effectively, the length of the bus at the upper corners thereof. The continuous longitudinal box-section elements which are thus formed at each of the upper corners of the hoops 8 constitute an upper frame member of the support structure of the bus.

Beneath the lower crosspieces 4 of the respective hoops 8 there are a pair of lower longitudinal members 11 constituted by two channel section elements having their channels facing downwardly; these elements are fixed beneath the said lower crosspieces 4, and over these crosspieces there is a continuous longitudinal element 12 constituted, in the embodiment illustrated, by a panel section having longitudinal corrugations. Each modular cell is moreover provided with auxiliary longitudinal spacers 13, each of which is supported on one of the lower longitudinal elements 11 and secured to the said longitudinal panel section 12, in such a way as to constitute, by cooperating with these said elements, a longitudinal reinforcing box disposed between the lower crosspieces 4 of each modular cell. The longitudinal elements 11, 12 thus constitute, by cooperating with the spacers 13, a lower frame of the support structure of the bus.

Each of the modular cells can be constructed and painted separately, and then subsequently be joined to the other modular cells in such a way as to form the overall support structure of the bus.

Obviously the number of modular cells used to form a support structure will determine the eventual length of the bus and the number used will be selected from time to time according to requirements. The cladding of the structure can be constituted by a plurality of modular sheets which fit individual cells or a predetermined plurality of cells.

In other embodiments (not shown) the transverse section of the crosspieces 3,4 and of the struts 5 which constitute each end frame 2 may be, for example, formed in a different way; for example each lower crosspiece 4 could have an S-form cross section and could be provided, at its lower longitudinal edge, with a flange shaped to allow welding to the adjacent crosspiece of a contiguous modular cell in the structure. In this case it would however be necessary also to utilise an element rigidly connected to the floor of the support structure to obtain the required box structure of the crosspiece.

Similarly, the box structure of the upper crosspiece of each hoop could be alternatively formed by utilising an element rigidly connected to the upper cladding of the structure.

Figure 4:
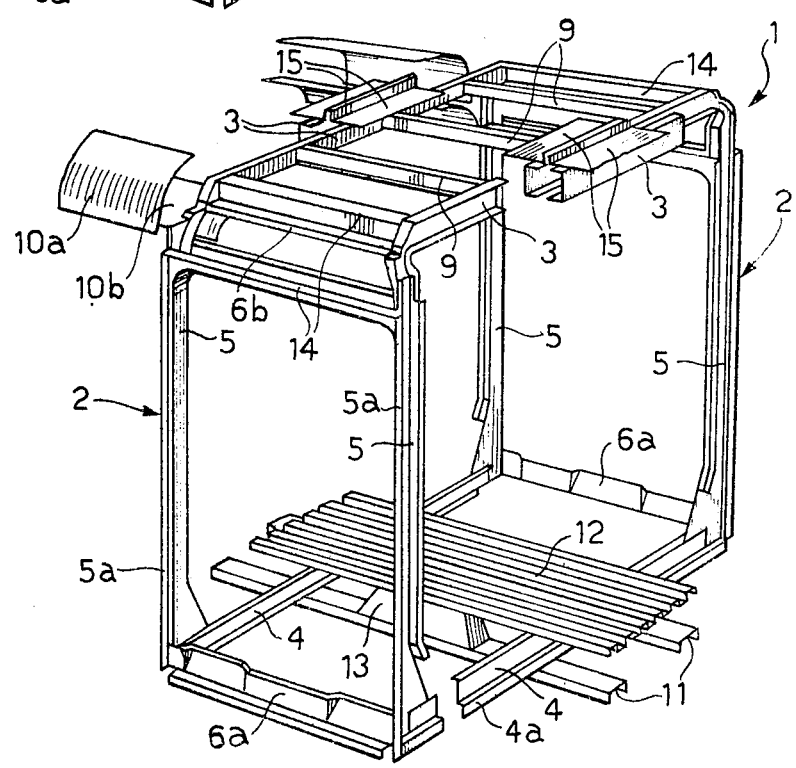
FIG. 4 is a perspective view of a modular cell formed as a second embodiment of the invention.

Such an embodiment is illustrated in FIG. 4, in which the parts in common with FIG. 1 are indicated with the same reference numerals. In this case, the lower horizontal crosspieces 4 of two adjacent frames belonging to two contiguous modular cells are connected together by means of the longitudinally corrugated panel section 12. Similarly the upper horizontal crosspieces 3 of each frame are connected together at the top by means of cladding elements 15 which cover the exterior of the support structure.

As can be seen, the upper horizontal crosspieces 3 are not provided with flanges such as the flanges 3a of the embodiment of FIG. 1, whilst the lower horizontal crosspieces 4 have a flange 4a only on their lower longitudinal edge.

What is claimed is:

1. A support structure for a motor bus, comprising:
a plurality of modular cells connected together in a row extending in the longitudinal direction of the bus, each modular cell including:
two rectangular end frames lying in a plane extending transverse the longitudinal axis of said bus, each said end frames being constituted by:
an upper horizontal crosspiece,
a lower horizontal crosspiece,
two upright struts interconnecting respective ends of said upper and lower horizontal crosspieces to define two upper corners and two lower corners, and
a pair of upper longitudinal elements and a pair of lower longitudinal elements respectively connecting together said upper corners and said lower corners of said end frames, said horizontal crosspieces and said upright struts of said end frames being of channel section oriented with the channel thereof facing away from the other frame of said cell in the axial direction of said structure, at least some of said horizontal crosspieces and said upright struts having, at least along a substantial part thereof, respective flanges lying in a plane parallel to the general plane of the associated end frame, said flanges on said crosspieces and struts of two adjacent frames belonging to two contiguous modular cells in said support structure being welded together so that said two adjacent frames form a box-section hoop, and
box-section reinforcing means interconnecting said modular cells together longitudinally.

2. The support structure of claim 1, wherein said reinforcing means interconnecting said modular cells comprise:
two pairs of upper longitudinal members which connect together said upper corners of said end frames of said modular cells, each pair of longitudinal members comprising:
an outer upper longitudinal member fixed to the outer edges of said upper corners of said hoops, and
an inner upper longitudinal member fixed to the inner edges of said upper corners of said hoops,
two lower longitudinal members fixed beneath said lower horizontal crosspieces of said end frames of said modular cells, and
a longitudinal panel element fixed to the tops of said lower horizontal crosspieces.

3. The support structure of claim 2, wherein each modular cell is provided with at least two pairs of auxiliary longitudinal elements which cooperate with said upper longitudinal members so as to complete two longitudinal box-section members extending between said upper corners of said two end frames of each said modular cell.

4. The support structure of claim 2, wherein each said modular cell is provided with two pairs of auxiliary longitudinal spacers, each of which is supported on one of said lower longitudinal members and fixed to said longitudinal panel element, so as to form two longitudinal box-section elements extending axially of each said modular cell.

5. The support structure of claim 2, wherein said longitudinal panel element has longitudinally extending corrugations.

6. The support structure of claim 2, wherein said longitudinal panel element is constituted by a plurality of longitudinal sections each having longitudinal corrugations, and extending axially for the length of one of said modular cells of said support structure, adjacent said panel sections overlapping at their ends.

7. The support structure of claim 1, wherein each said modular cell is provided with a plurality of auxiliary longitudinal elements which connect together said upper horizontal crosspieces of the two end frames of each said modular cell.

8. The support structure of claim 1, wherein said longitudinal elements which connect together said lower corners of said end frames of said modular cells which are positioned at the locations of the axles of the vehicle are constituted by two arcuate elements serving as mudguards, the corresponding longitudinal elements of said other modular cells being constituted by substantially rectilinear longitudinal stringers.

9. The support structure of claim 1 wherein, said upper horizontal crosspieces of two adjacent frames belonging to contiguous modular cells are joined together by cladding elements which clad said support structure.

10. The support structure of claim 2, wherein said lower horizontal crosspieces of two adjacent frames belonging to contiguous modular cells are connected together by said longitudinal panel element.

* * * * *

UNITED STATES PATENT AND TRADEMARK OFFICE
CERTIFICATE OF CORRECTION

PATENT NO. : 4,254,987
DATED : March 10, 1981
INVENTOR(S) : Raffaele LEONARDIS

It is certified that error appears in the above-identified patent and that said Letters Patent are hereby corrected as shown below:

Please correct the foreign priority data information as follows:

Delete "569896 A/78" and insert therefor --69896 A/78--;

Delete the filing date of "Nov. 26, 1979" and insert therefor --Nov. 27, 1979--.

Signed and Sealed this

Second Day of June 1981

[SEAL]

Attest:

RENE D. TEGTMEYER

Attesting Officer  Acting Commissioner of Patents and Trademarks